United States Patent [19]
Head

[11] Patent Number: 5,897,077
[45] Date of Patent: *Apr. 27, 1999

[54] QUICK-CHANGE SKID LANDING GEAR

[75] Inventor: Robert E. Head, Gilbert, Ariz.

[73] Assignee: McDonnell Douglas Helicopter Co., Mesa, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/693,514

[22] Filed: Aug. 2, 1996

[51] Int. Cl.$^6$ .................................................. B64C 25/66
[52] U.S. Cl. .................................. 244/17.17; 244/103 R; 244/108
[58] Field of Search .......................... 244/17.17, 100 R, 244/103 R, 108, 109, 118.1, 137.1; 24/543, 30.5 P; 411/539, 540, 433; 403/338, 344, 385

[56] References Cited

U.S. PATENT DOCUMENTS

| | | | |
|---|---|---|---|
| 727,707 | 5/1903 | Stauffer et al. | 411/539 X |
| 945,106 | 1/1910 | Moodey | 403/344 |
| 2,826,434 | 3/1958 | Echols . | |
| 2,964,271 | 12/1960 | Strawn . | |
| 3,173,632 | 3/1965 | Woods | 244/17.17 X |
| 3,185,409 | 5/1965 | Jacobsen | 244/17.17 X |
| 3,537,150 | 11/1970 | Emberson | 403/344 |
| 4,270,711 | 6/1981 | Cresap et al. | 244/17.17 |
| 4,516,744 | 5/1985 | Burnside | 244/17.17 |
| 4,600,168 | 7/1986 | Selecman | 244/17.17 X |
| 4,603,869 | 8/1986 | Maxwell | 244/17.17 X |
| 5,060,886 | 10/1991 | Davis et al. | 244/17.17 X |
| 5,109,580 | 5/1992 | Camus | 244/118.1 X |
| 5,209,431 | 5/1993 | Bernard et al. . | |
| 5,351,916 | 10/1994 | McGonigle et al. | 244/137.1 X |
| 5,791,593 | 8/1998 | Warren, III | 244/17.17 |

Primary Examiner—William Grant
Attorney, Agent, or Firm—Donald E. Stout; Kentor R. Mullins

[57] ABSTRACT

A low-profile transportation and storage assembly is readily substitutable with a conventional pair of skid landing gear. The low-profile transportation and storage assembly includes a front auxiliary crosstube having low-profile wheels attached to opposing ends of the front auxiliary crosstube, and a rear auxiliary crosstube having low-profile wheels attached to opposing ends of the rear auxiliary crosstube. Both the front auxiliary crosstube and the rear auxiliary crosstube are readily substitutable with the pair of skid landing gear of a conventional helicopter. A pair of front saddle mounts and a pair of rear saddle mounts secure the front crosstube and the back crosstube of the pair of skid landing gear to the helicopter. The pair of front saddle mounts and the pair of rear saddle mounts can be quickly removed from the aft crosstube and the forward crosstube by removal of expandable bushing fittings of the saddle mounts. These same saddle mounts or other saddle mounts can then be used to quickly and conveniently secure the front auxiliary crosstube and the rear auxiliary crosstube to the helicopter to thereby facilitate transportation and low-profile storage of the helicopter. An improved tail skid mount fitting is provided for holding the tail skid in one of an operating configuration and a low-profile storage configuration. The low-profile storage configuration of the tail skid surrounds and protects a portion of the tailboom of the helicopter.

25 Claims, 4 Drawing Sheets

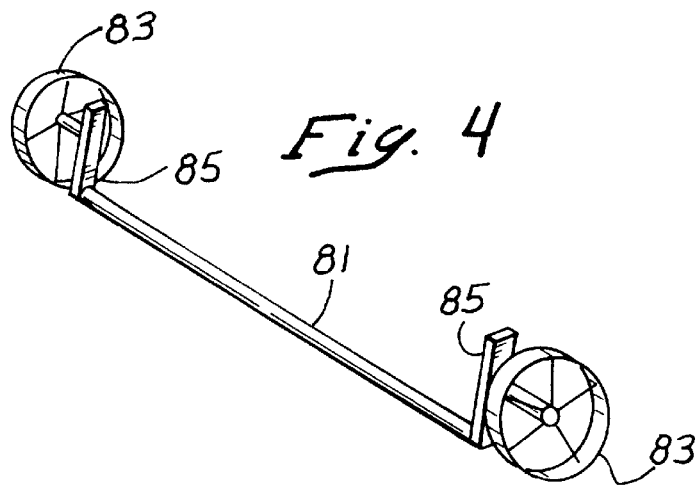
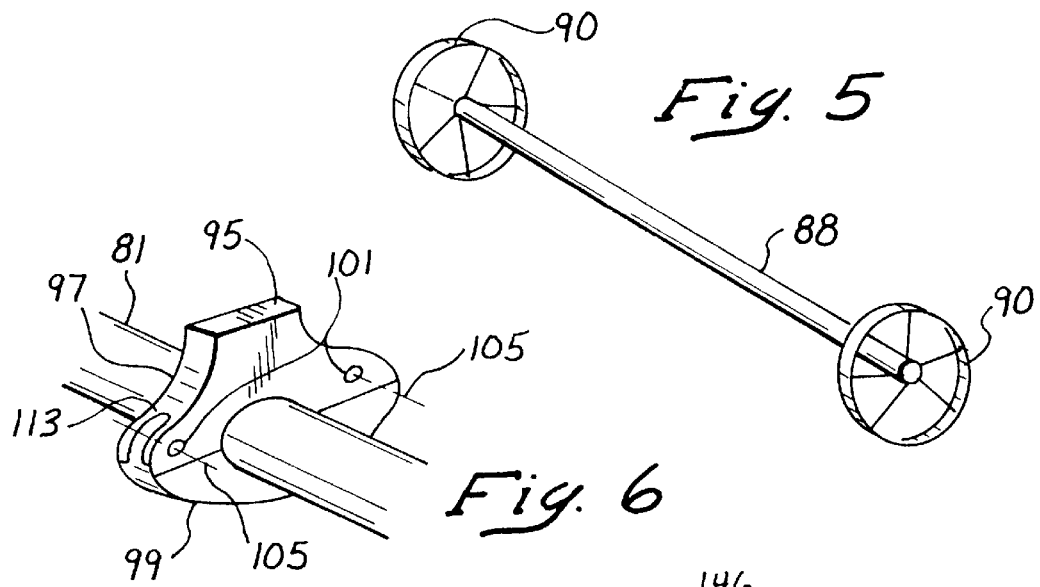
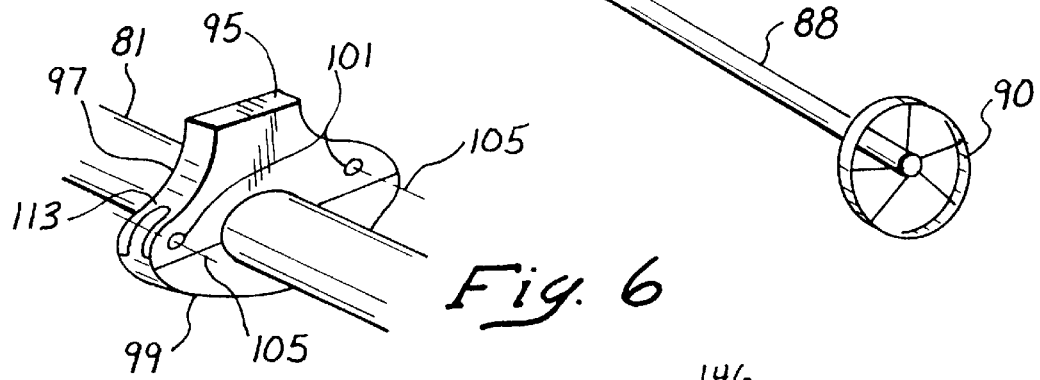
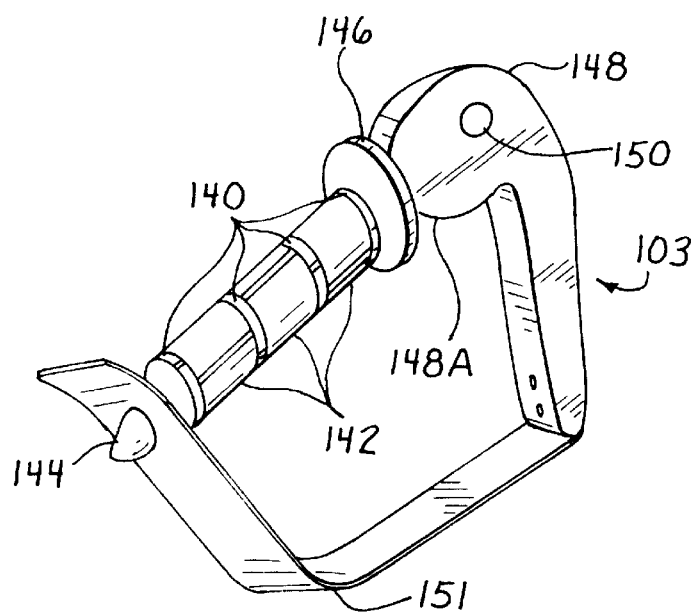
Fig. 9 PRIOR ART

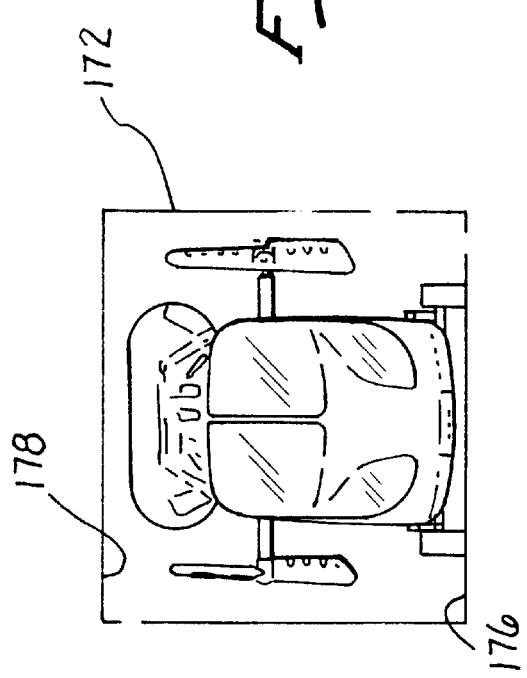
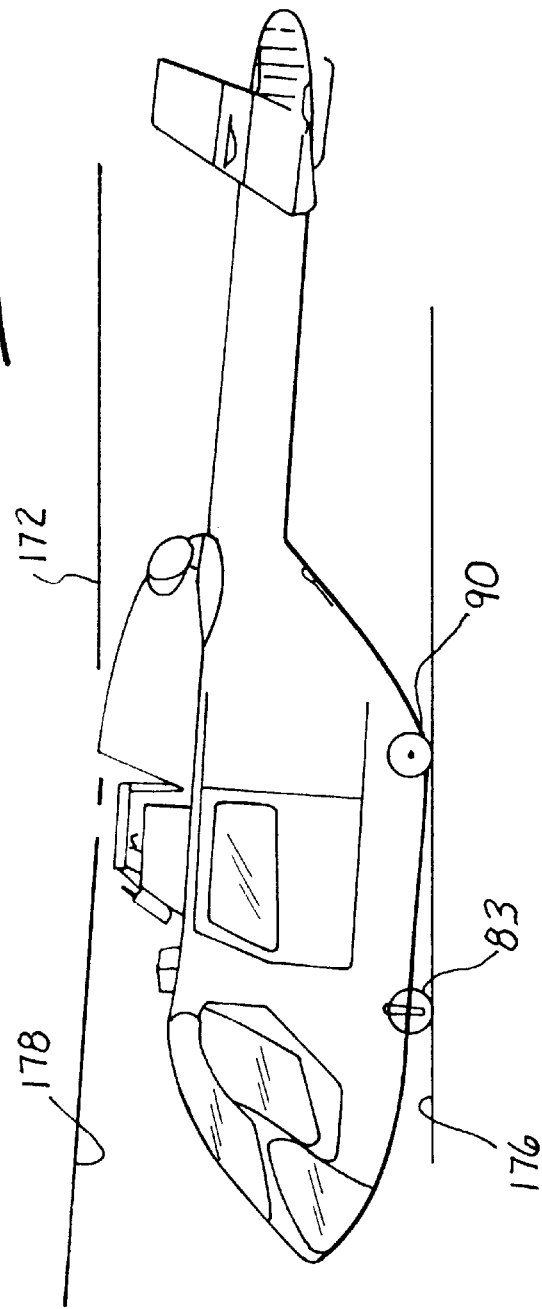

QUICK-CHANGE SKID LANDING GEAR

BACKGROUND OF THE INVENTION

1. Field of the Invention

The present invention relates generally to helicopters and, more particularly, to skid landing gear that are quickly removable using expandable bushing fittings to facilitate compact storage of helicopters.

2. Description of Related Art

Military and commercial helicopters are often transported by fixed-wing transport planes to new operational sites. Since cargo space is always at a premium, these helicopters must in most cases be partially disassembled to fit into the cargo holds of the delivery vehicles. Especially when the helicopter is to be used for military purposes, it is desirable that the helicopter be easily and quickly reassembled at the destination, preferably without the aid of heavy or complex equipment which must also be shipped to the reassembly location. Although the same urgency is usually not prevalent for civilian helicopters, a capability for quick and convenient assembly and disassembly would no doubt be appreciated by civilian operators.

FIG. 1 illustrates a conventional pair of skid landing gear 15 for use with a helicopter. The pair of skid landing gear 15 comprises two skids 17 and 19 having abrasion shoes 21 and 23, respectively. These skids 17 and 19 further comprise steps 28 and 30. The two skids 17 and 19 are joined by an aft crosstube 33 and a forward crosstube 35. Fittings 37 and 39 join the aft crosstube 33 to both the skid 17 and the skid 19, and fittings 41 and 43 join the forward crosstube 35 to both the skid 17 and the skid 19. Dampers 50 and 53 are positioned at the interface between the aft crosstube 33 and the two skids 17 and 19.

The pair of skid landing gear 15 is joined to the fuselage of a helicopter (not shown) via an aft fuselage fitting 58, an aft saddle point fitting 60, a forward saddle fitting 62, and a forward fuselage fitting 64. The aft fuselage fitting 58 and the aft saddle point fitting 60 secure the aft crosstube 33 to the fuselage of the helicopter, and the forward saddle fitting 62 and the forward fuselage fitting 64 secure the forward crosstube 35 to the fuselage of the helicopter.

FIG. 2 illustrates a closeup view of the forward saddle fitting 62. The forward saddle fitting 62 comprises two tension bolt apertures 71. These tension bolt apertures 71 accommodate tension bolts (not shown), which are carefully torqued into the bottom of the helicopter fuselage to thereby secure the forward crosstube 35 to the helicopter. Similarly, as illustrated in FIG. 3, the aft saddle point fitting 60 comprises two tension bolt apertures 74 for accommodating two tension bolts. These tension bolts are fed through the tension bolt apertures 74 and into the fuselage of the helicopter, and are then carefully torqued. The process of securing the pair of skid landing gear 15 to the fuselage of a helicopter can be cumbersome.

Although the prior art has recognized some of the advantages associated with attaching wheels to the pair of skid landing gear 15, the prior art has not endeavored to replace the pair of skid landing gear 15 with a pair auxiliary crosstubes having low-profile wheels attached thereto to thereby facilitate compact storage of the helicopter. U.S. Pat. No. 5,060,886 to Davis et al. discloses an auxiliary wheeled landing gear that may be substituted for a baseline skid landing gear on a helicopter. This substitution is intended for those operators who desire to taxi their helicopters on the ground in order to avoid aerial taxiing or the inconvenience of using dolly wheels and a tow bar. The wheels, however, are not low profile, and once installed, the wheels do not appear to be readily removable. The installation of the wheels according to this patent appears to incorporate standard aircraft bolts and nuts. U.S. Pat. No. 5,109,580 to Canus discloses an assembly of clamps and fittings for attaching a platform to a helicopter's skid landing gear. This patent, however, does not address the concern of providing readily attachable and detachable low-profile wheels as a substitution for the skid landing gear of a helicopter.

SUMMARY OF THE INVENTION

The low-profile transportation and storage assembly of the present invention is readily substitutable with a conventional pair of skid landing gear. The low-profile transportation and storage assembly of the present invention includes a front auxiliary crosstube having low-profile wheels attached to opposing ends of the front auxiliary crosstube, and a rear auxiliary crosstube having low-profile wheels attached to opposing ends of the rear auxiliary crosstube. Both the front auxiliary crosstube and the rear auxiliary crosstube are readily substitutable with the pair of skid landing gear of a conventional helicopter. According to the present invention, a pair of front saddle mounts and a pair of rear saddle mounts secure the front crosstube and the back crosstube of the pair of skid landing gear to the helicopter. The pair of front saddle mounts and the pair of rear saddle mounts can be quickly removed from the aft crosstube and the forward crosstube by removal of expandable bushing fittings of the saddle mounts. These same saddle mounts or other saddle mounts can then be used to quickly and conveniently secure the front auxiliary crosstube and the rear auxiliary crosstube to the helicopter to thereby facilitate transportation and low-profile storage of the helicopter. According to another feature of the present invention, an improved tail skid mount fitting is provided for holding the tail skid in one of an operating configuration and a low-profile storage configuration. The low-profile storage configuration of the tail skid surrounds and protects a portion of the tailboom of the helicopter.

According to one aspect of the present invention, a saddle mount is provided for detachably securing a crosstube to a helicopter using expandable bushing fittings. The saddle mount includes two apertures adapted for accommodating two expandable bushing fittings therethrough. The apertures have aperture axes that are substantially parallel to axes of the crosstube. The saddle mount further includes two hinged members adapted for snugly fitting around the crosstube. The two hinged members together are movable between an open configuration where the saddle mount can be removed from around the crosstube, and a closed configuration where the saddle mount is closed around the crosstube to thereby secure the crosstube to the helicopter. The expandable bushing fittings can be placed into the saddle mount to secure the saddle mount around the crosstube, and can be removed from the apertures of the saddle mount to remove the saddle mount from around the crosstube. The crosstube may have a semicircular cross section, and each of the apertures of the saddle mount may have corresponding semicircular cross sections. These semicircular configurations prevent rotation of the crosstube within the apertures of the saddle mounts.

According to another aspect of the present invention, a crosstube assembly is adapted for being detachably secured to a helicopter. The crosstube assembly includes a front crosstube and a pair of saddle mounts adapted for detachably securing the front crosstube to the helicopter using expandable bushings. The crosstube assembly further includes a rear crosstube and a pair of rear saddle mounts adapted for detachably securing the rear crosstube to the helicopter using expandable bushings. A plurality of saddle mounts may be used for detachably securing each of the front crosstube and the rear crosstube to the helicopter using the expandable bushing fittings. The front crosstube and the rear crosstube together may constitute a pair of skid landing gear or, alternatively, may constitute a pair of auxiliary crosstubes having low-profile wheels attached thereto. The low-profile wheels of at least one of the auxiliary crosstubes may be pivotable about axes that are substantially perpendicular to an axis of the auxiliary crosstube. Additionally, the wheels of at least one of the auxiliary crosstubes may be changeable in height above a support surface, relative to the auxiliary crosstube.

According to another aspect of the present invention, a method is provided for preparing a helicopter for storage or transportation within a low clearance area. The method includes a first step of removing a pair of skid landing gear from a fuselage of the helicopter. This step of removing the pair of skid landing gear may include a step of removing a plurality of saddle mounts from the pair of skid landing gear. Another step of securing both a front crosstube and a rear crosstube to the fuselage of the helicopter follows. Both the front crosstube and the rear crosstube have low-profile wheels secured at opposing ends thereof, and both of these crosstubes may be secured using expandable bushings and saddle mounts.

The present invention, together with additional features and advantages thereof, may best be understood by reference to the following description taken in connection with the accompanying illustrative drawings.

BRIEF DESCRIPTION OF THE FIGURES

FIG. 4 is a perspective view of a front auxiliary crosstube according to the presently preferred embodiment;

FIG. 5 is a perspective view of a rear auxiliary crosstube according to the presently preferred embodiment;

FIG. 6 illustrates a perspective view of a front saddle mount according to the presently preferred embodiment;

FIG. 9 illustrates a perspective view of a conventional expandable bushing fitting which is used by the present invention;

FIG. 12 illustrates a front elevational view of a helicopter stored in a cargo area according to the present invention; and FIG. 13 illustrates a side elevational view of a helicopter stored in a cargo area according to the present invention.

DETAILED DESCRIPTION OF THE PREFERRED EMBODIMENT

Figure 7:
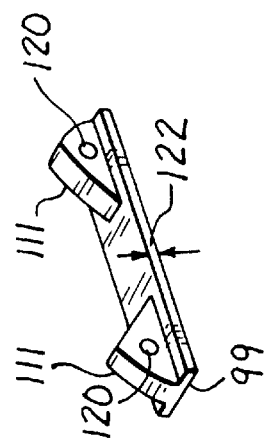
FIG. 7 illustrates an alternative embodiment of a portion of the front saddle mount of FIG. 6.

Turning to FIG. 4, a front auxiliary crosstube 81 is illustrated having two wheels 83 attached at opposing ends thereof. Each of the wheels 83 is connected to the front auxiliary crosstube 81 via an elevator and/or pivot shaft 85. As presently embodied, the front auxiliary crosstube 81 comprises a circular cross section, as indicated in FIG. 6, for example. In an alternative embodiment, the front auxiliary crosstube 81 comprises a semicircular cross section, as indicated in FIG. 7, with the flat portion of the front auxiliary crosstube 81 facing toward a support surface for an extra-low profile. The elevator and/or pivot shafts 85 on each side of the front auxiliary crosstube 81 facilitates vertical movement of the wheels 83 relative to the front auxiliary crosstube 81. Movement of the wheels 83 in the vertical direction allows a user to tailor the ground clearance as the helicopter is rolled into or out of a cargo bay. These elevators 85 may be powered manually or electrically and, as presently embodied, are synchronized to move together. Additionally, the wheels 83 are preferably able to swivel about axes formed by the corresponding elevator and/or pivot shafts 85, to thereby facilitate guiding of the helicopter into the cargo bay.

FIG. 5 illustrates a rear auxiliary crosstube 88 having two rear wheels 90 attached at opposing ends thereof. The two wheels 90 preferably do not have elevator and/or pivot shafts, but either or both of these features may be incorporated according to design preference. The front auxiliary crosstube assembly and the rear auxiliary crosstube assembly are configured to be interchangeable with the forward crosstube 35 and the aft crosstube 33, respectively, of FIG. 1. The diameter of the forward auxiliary cross tube 81 is preferably configured to correspond to the diameter of the forward cross tube 35, and the diameter of the rear auxiliary crosstube 88 is preferably configured to correspond to the diameter of the aft crosstube 33. According to one embodiment of the present invention, the forward saddle fitting 62, the forward fuselage fitting 64, the aft fuselage fitting 58, and the aft saddle point fitting 60 of FIG. 1 may be removed from the pair of skid landing gear 15 and, subsequently, used to secure the front auxiliary crosstube 81 and the rear auxiliary crosstube 88 to the helicopte. Expandable bushing fittings, such as shown in FIG. 9, can be used in combination with the fittings 58, 60, 62 and 64. The front auxiliary crosstube 81 and the rear auxilia crosstube 88 reduce the height of the helicopter, and also facilitate relatively easy transportation of the helicopter into a storage area.

Figure 1:
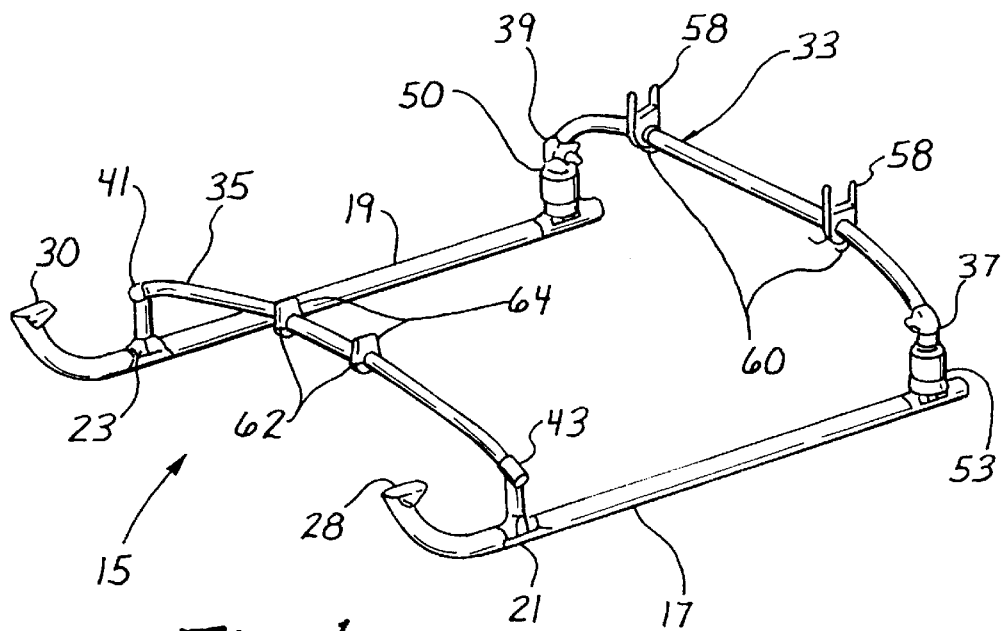
FIG. 1 is a perspective view of a pair of skid landing gear according to the prior art.
Figure 2:
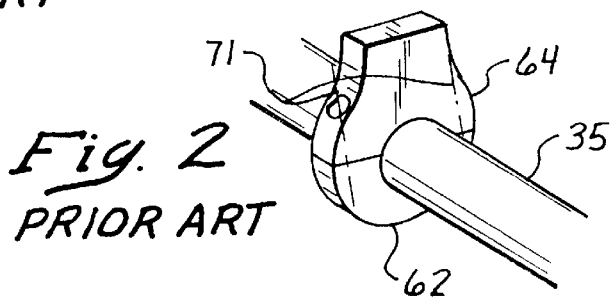
FIG. 2 is a perspective view of a forward saddle fitting of the prior art.
Figure 3:
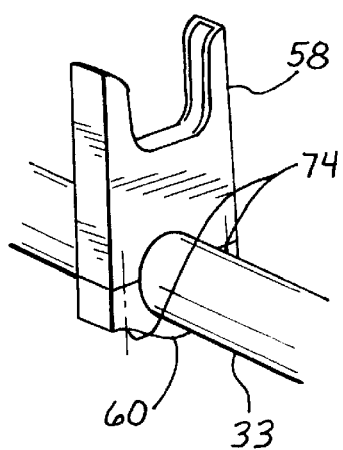
FIG. 3 is a perspective view of an aft saddle point fitting of the prior art.

In the presently preferred embodiment, the forward saddle fitting 62 and the forward fuselage fitting 64 of FIG. 1 are replaced by front saddle mounts, such as that shown at 95 of FIG. 6. The front saddle mount 95 preferably comprises a top member 97 and a bottom member 99. Both the top member 97 and the bottom member 99 when secured together, form an aperture for accommodating and fitting around the front auxiliary crosstube 81. Both the top member 97 and the bottom member 99 comprise expandable bushing fitting apertures 101 for accommodating expandable bushing fittings 103 (FIG. 9). Although expandable bushing fittings 103 are presently preferred, other securing means, such as conventional aircraft nuts and bolts, may be used. The top member 97 and the bottom member 99 are preferably secured together via expandable bushing fittings 103 (FIG. 9), which fit into expandable bushing fitting apertures 101. According to one aspect of the present invention, the axes 105 of the expandable bushing fitting apertures 101 are parallel to the support surface. In contrast, the forward saddle fitting 62 (FIG. 2) and the aft saddle point fitting 60 (FIG. 3) of the prior art have tension bolt apertures 71 and 74 which are perpendicular to a support surface. The orientation of the expandable bushing fitting apertures 101 of the saddle mounts of the present invention facilitate quick and convenient access, compared to prior art configurations, especially when expandable bushing fittings 103 are used.

FIG. 7 illustrates a perspective view of the bottom hinged member 99 in accordance with an alternative embodiment. The two flanges 111 fit between corresponding flanges 113 of the top member 97. Once the apertures 120 of the bottom member 99 are aligned with the expandable bushing fitting apertures 101 of the top member 97, expandable bushing fittings 103 may be inserted therethrough, to thereby secure the front saddle mount 95 around either a forward crosstube 35 having a cross section similar to that of the front auxiliary crosstube 81 or the front auxiliary crosstube 81 (FIG. 4). A minimum thickness 122 of the bottom member 99 is engineered according to shipping load requirements.

Figure 8:
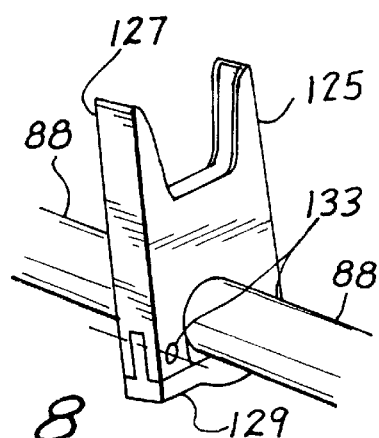
FIG. 8 illustrates a perspective view of a rear saddle mount according to the presently preferred embodiment.

FIG. 8 illustrates a rear saddle mount 125, which comprises a top member 127 and a bottom member 129. Similarly to FIG. 6, the top member 127 is secured to the bottom member 129 via expandable bushing fittings 103, as presently preferred, which fit into expandable bushing fitting apertures 133. The rear saddle mount 125 is preferably adapted to fit around both the aft crosstube 33 (FIG. 1) and the rear auxiliary crosstube 88 (FIG. 5). As presently embodied, the rear auxiliary crosstube 88 comprises a circular cross section, which corresponds to an aperture formed by the top member 127 and the bottom member 129. Alternatively, the rear auxiliary crosstube 88 may comprise a semicircular cross section, and the aperture formed between the top member 127 and the bottom member 129 may be semicircular. The expandable bushing fitting apertures 133 preferably have axes which are parallel to the rear auxiliary crosstube 88, and preferably are configured to facilitate expandable bushing fittings 103. Alternatively, these apertures 133 may be configured to facilitate other securing means, such as conventional aircraft nuts and bolts.

FIG. 9 illustrates an unthreaded, expandable bushing fitting 103, which comprises expandable male annular bushings 140. The expandable bushing fitting 103 also comprises split female bushings 142, a guide 144, washer 146, a cam actuator handle 148, and a trunion 150. As presently embodied, counterclockwise rotation of the cam actuator handle 148 moves a cam (not shown) which, in turn, forces the expandable male annular bushings 21 to expand radially outward. A safety lock spring 151 is also used in the presently preferred embodiment. The expandable bushing fitting 103 is used in the present invention to removably connect the front saddle mount 95 and the rear saddle mount 125 together.

In order to secure the rear saddle mount 125 onto the aft crosstube 33 (FIG. 1), for example, the safety lock springs 151 of two expandable bushing fittings 103 are removed from their corresponding guides 144, and the guides 144 are inserted through the expandable bushing fitting apertures 133 of the rear saddle mount 125. After the guide 144 of each expandable bushing fitting 103 is inserted through an expandable bushing fitting aperture 133, the safety lock spring 151 is secured over the guide 144. When inserted through the expandable bushing fitting aperture 133, the cam actuator handle 148 protrudes from the rear saddle mount 125. Rotation of the cam actuator handle 148 about the trunion 150 causes the radial expansion of the expandable male annular bushings 140 against the interior walls of the expandable bushing fitting apertures 133 and, consequently, locks the expandable bushing fitting 103 within the expandable bushing fitting aperture 133. When both of the expandable bushing fittings 103 are locked within their respective expandable bushing fitting apertures 133, the rear saddle mount 125 is securely attached to the aft crosstube 33, for example. The two expandable bushing fittings 103 may be quickly removed from the expandable bushing fitting apertures 133 by movement of the safety lock spring 151 away from the guide 144 and rotation of the cam actuator handle 148 to reduce the diameters of the expandable male annular bushings 140.

Figure 10:
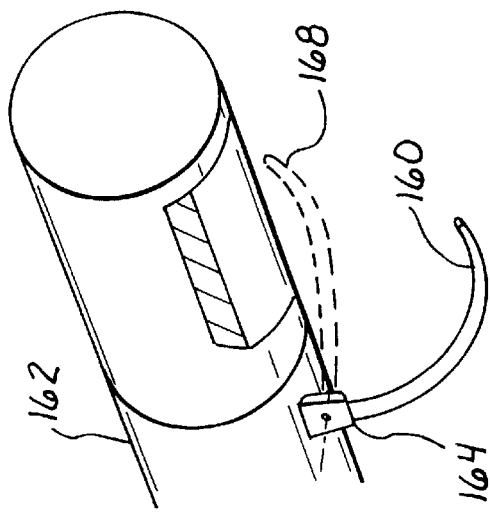
FIG. 10 illustrates a perspective view of a movable tail skid according to the presently preferred embodiment.

Turning to FIG. 10, a tailskid 160 is mounted to a tailboom 162 of the helicopter via a revised mount fitting 164. The revised mount fitting 164 mounts the tailskid 160 to the bottom of the tailboom 162 with at least one expandable bushing fitting 103, as presently preferred, to facilitate rapid removal and reinstallation. The revised mount fitting 164 of the present invention permits installation of the tailskid 160 in a normal flight position and in a semi-retracted protection configuration 168. The tailskid 160 is shown in the semi-retracted protection configuration 168 with phantom lines in FIG. 10. The semi-retracted protection configuration 168 helps to protect the aft end of the tailboom 162 when the helicopter is loaded or unloaded.

Figure 11:
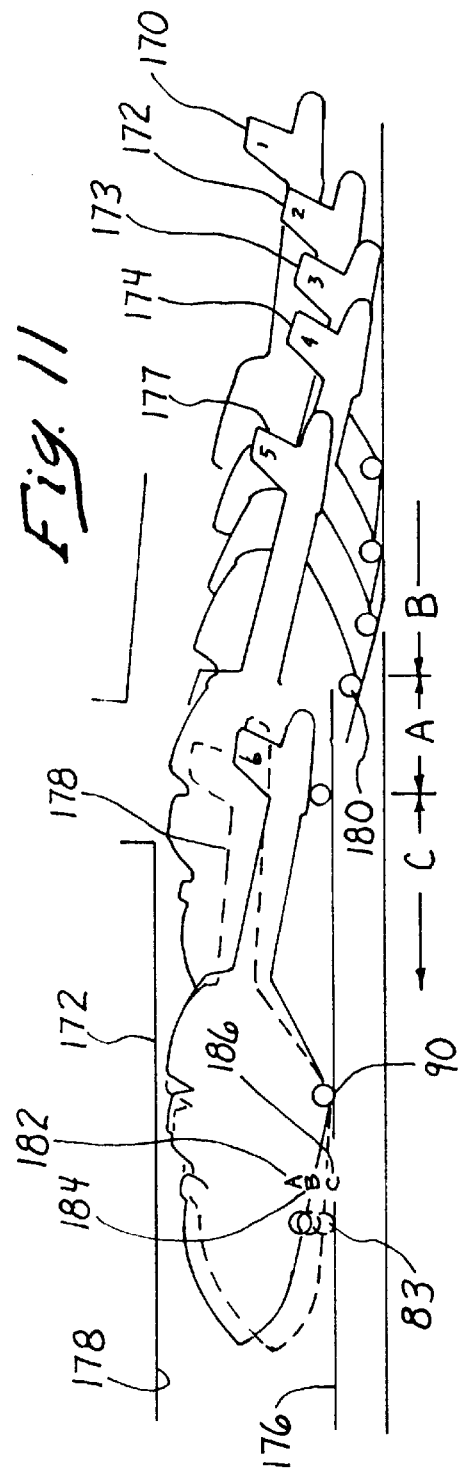
FIG. 11 illustrates a sequence of positioning of a helicopter for storage, according to the presently preferred embodiment.

FIG. 11 is a sequential schematic diagram illustrating loading of a helicopter 170 within a cargo bay 172. Although the present invention may be used with a variety of helicopters 170 and cargo bays 172, the presently preferred embodiment applies to a McDonnell Douglas MD900 "Explorer" Helicopter. The cargo bay in this presently preferred embodiment comprises a C-130 cargo aircraft. In order to facilitate loading of this helicopter 170 within the cargo bay 172, the rotor, rotor mast, rotor controls, and upper cowlings are removed from the helicopter 170 to thereby reduce the height of the helicopter. According to the present invention, the pair of skid landing gear 15 are removed from the helicopter 170 by removing expandable bushing fittings 103 from the front saddle mounts 95 and the rear saddle mounts 125. The only tools required for this operation are jacks, for example, for supporting the helicopter 170 while the skid landing gear are replaced with the front auxiliary crosstube 81 and the rear auxiliary crosstube 88 of the present invention. As presently embodied, the same front saddle mount 95 and rear saddle mount 125, which were used for attaching the forward crosstube 35 and the aft crosstube 33, are used to secure the front auxiliary crosstube 81 and the rear auxiliary crosstube 88. Alternatively, other saddle mounts may be used for the front and rear auxiliary crosstubes 81 and 88.

Once the front auxiliary crosstube 81 and the rear auxiliary crosstube 88 are secured to the fuselage of the helicopter 170, the helicopter may be removed from the jack and placed upon the wheels 83 and 90. As presently embodied, the tailskid 160 is placed into the semi-retracted protection configuration 168 using expandable bushing fittings 103.

A few minor modifications may be made to facilitate even quicker substitution of the front auxiliary crosstube 81 and rear auxiliary crosstube 88 for the pair of skid landing gear 15 of the Explorer helicopter of the presently preferred embodiment. For example, the non-structural cover protecting the aft crosstube 33 may be deleted from the design of the helicopter to thereby facilitate rapid removal and installation of the aft crosstube 33, jack points on the bottom of the fuselage may be repositioned to not interfere with the substitution process, and conventional quick-disconnect electrical fittings for the electrical grounding cables (which conventionally comprise bolt-on grounding straps at each saddle location for electrically bonding the skid landing gear to the airframe) may be used for the electrical grounding cables to replace the conventional bolt-on connectors. According to the presently preferred embodiment, the forward and aft saddle mounts 95 and 125 retain provisions for attaching the external cargo lift cables. As presently embodied, both the front auxiliary crosstube 81 and the rear auxiliary crosstube 88 are configured with a link appropriate for locating the wheels 83 and 90 at ends slightly outboard of the sides of the fuselage. The wheels 90 of the rear auxiliary crosstube 88 are preferably configured to permit an approximately one inch clearance under the fuselage of the helicopter.

After the topside equipment, such as the rotor, have been removed from the helicopter 170 and the pair of skid landing gear 15 has been replaced by the front auxiliary crosstube 81 and the rear auxiliary crosstube 88, the tailskid 160 is moved into the semi-retracted protection configuration 168, as previously mentioned. The helicopter 170 is then inserted into the cargo bay 172 nose first and the adjustable height forward wheels 83 are manipulated as indicated in FIG. 11 to achieve proper clearance between the floor 176 and ceiling 178. A second position of the helicopter 172 has the nose tilted upward, as a consequence of the moving onto the ramp 180. The wheels 83 may be placed, for illustrative purposes, among three positions, which comprise a low-profile position 182, an intermediate position 184, and an extended position 186. The front wheels 183 are preferably maintained in the intermediate profile configuration 184 as the helicopter is moved through the positions 170, 172, and 173. The front wheels 83 are then preferably moved into the low-profile configuration 182 as the helicopter moves along the upper portion of the ramp 180, as indicated at position 174 in FIG. 11. Finally, as the front wheels 83 of the helicopter move onto the floor 176, the front wheels 83 are preferably placed into the extended position 186, as indicated at the helicopter position 177. In an alternative embodiment, the helicopter may be placed into the position 178 shown in phantom, where the tailboom 162 is raised and the front wheels 83 are placed into the low-profile configuration 182. After the helicopter is secured by tie-down straps within the cargo bay 172, the rotor hub, rotor blades, etc. may be secured to the floor 176 of the cargo bay 172. FIG. 12 illustrates a front view of the helicopter within the cargo bay 172, and FIG. 13 illustrates a side view of the helicopter within the cargo bay 172.

Although the present invention is described with reference to a specific helicopter and cargo bay, the concept of the present invention may be used on a variety of helicopters, preferably helicopters with skid landing gear. The present invention is particularly applicable for reducing a clearance of a helicopter before storage or transportation of the helicopter. Although exemplary embodiments of the invention have been shown and described, many other changes, modifications and substitutions, in addition to those set forth in the above paragraphs, may be made by one having ordinary skill in the art without necessarily departing from the spirit and scope of this invention.

I claim:

1. A pair of auxiliary crosstubes adapted for interchangeably replacing a pair of skid landing gear of a helicopter in preparation for transport or storage of the helicopter, the pair of auxiliary crosstubes comprising:

a front auxiliary crosstube having two opposing ends and a crosstube axis extending therebetween, the maximum length of the front auxiliary crosstube being defined between the two opposing ends, the front auxiliary crosstube being adapted for being detachably secured to the helicopter using expandable bushing fittings;

a front pair of wheels coupled to the two opposing ends of the front auxiliary crosstube, each of the front pair of wheels having an axis of rotation which is positioned collinear with or above the crosstube axis when the front auxiliary crosstube is detachably secured to the helicopter;

a rear auxiliary crosstube having two opposing ends and a rear crosstube axis extending therebetween, the maximum length of the rear auxiliary crosstube being defined between the two opposing ends of the rear auxiliary crosstube, the rear auxiliary crosstube being adapted for being detachably secured to the helicopter using expandable bushing fittings; and a rear pair of wheels coupled to the two opposing ends of the rear auxiliary crosstube, each of the rear pair of wheels having an axis of rotation which is positioned collinear with or above the rear crosstube axis when the rear auxiliary crosstube is detachably secured to the helicopter.

2. The pair of auxiliary crosstubes as recited in claim 1, further comprising:

a pair of front saddle mounts adapted for detachably securing the front auxiliary crosstube to the helicopter using expandable bushing fittings; and a pair of rear saddle mounts adapted for detachably securing the rear auxiliary crosstube to the helicopter using expandable bushing fittings.

3. The pair of auxiliary crosstubes as recited in claim 2, each of the front saddle mounts comprising two apertures adapted for accommodating two expandable bushing fittings, the two apertures having aperture axes which extend along longitudinal lengths of the apertures of the front saddle mounts, and which are substantially parallel to the crosstube axis of the front auxiliary crosstube when the front saddle mounts are used to detachably secure the front auxiliary crosstube to the helicopter, and each of the rear saddle mounts comprising two apertures adapted for accommodating two expandable bushing fittings, the two apertures having aperture axes which extend along longitudinal lengths of the apertures of the rear saddle mounts, and which are substantially parallel to the rear crosstube axis of the rear auxiliary crosstube when the rear saddle mounts are used to detachably secure the rear auxiliary crosstube to the helicopter.

4. The pair of auxiliary crosstubes as recited in claim 3, each of the front saddle mounts comprising two members adapted for snugly fitting around the front auxiliary crosstube, the two members together being movable between an open configuration where the front saddle mount can be removed from around the front auxiliary crosstube and a closed configuration where the front saddle mount is closed around the front auxiliary crosstube, and each of the rear saddle mounts comprising two members adapted for snugly fitting around the rear auxiliary crosstube, the two members together being movable between an open configuration where the rear saddle mount can be removed from around the rear auxiliary crosstube and a closed configuration where the rear saddle mount is closed around the rear auxiliary crosstube.

5. The auxiliary apparatus as recited in claim 4, wherein:

the accommodation of two expandable bushing fittings into the two apertures of each front saddle mount, when each front saddle mount is in the closed configuration, secures each front saddle mount around the front auxiliary crosstube, and the accommodation of two expandable bushing fittings into the two apertures of each rear saddle mount, when each rear saddle mount is in the closed configuration, secures each rear saddle mount around the rear auxiliary crosstube.

6. The pair of auxiliary crosstubes as recited in claim 5, wherein, when two expendable bushing fittings are fitted within the two apertures of each of the front saddle mounts the two expandable bushing fittings in each front saddle mount can be removed from the two apertures of the front saddle mount, when the front saddle mount is in The closed configuration, to thereby facilitate removal of each of the front saddle mounts from around the front auxiliary crosstube, and wherein, when two expandable bushing fittings are fitted within the two apertures of each of the rear saddle mounts the two expandable bushing fittings in each rear saddle mount can be removed from the two apertures of the rear saddle mount, when the rear saddle mount is in the closed configuration, to thereby facilitate removal of each of the rear saddle mounts from around the rear auxiliary crosstube.

7. The auxiliary apparatus as recited in claim 6, the rear auxiliary crosstube comprising a substantially circular cross section which is substantially constant throughout the maximum length of the rear auxiliary crosstube, and the front auxiliary crosstube comprising a substantially semicircular cross section which is substantially constant throughout the maximum length of the front auxiliary crosstube.

8. The auxiliary apparatus as recited in claim 7, the two members of each rear saddle mount, when moved into the closed configuration, forming a rear crosstube aperture having a circular cross section, and the two members of each front saddle mount, when moved into the closed configuration forming a front crosstube aperture having a semicircular cross section.

9. The auxiliary apparatus as recited in claim 8, a flat portion of the semi-circular front auxiliary crosstube contacting flat portions of the two front crosstube apertures of the front saddle mounts to thereby prevent the semi-circular front auxiliary crosstube from rotating about the crosstube axis of the semi-circular front auxiliary crosstube.

10. An auxiliary apparatus adapted for interchangeably replacing a skid landing gear of a helicopter in preparation for transport or storage of the helicopter, the auxiliary apparatus comprising:

a low-profile frame member adapted for being detachably secured to the helicopter with at least one expandable bushing bolt, the low-profile frame member having a frame axis extending along a longitudinal length of the low-profile frame member; and at least one wheel adapted to attach to the low-profile frame member, wherein an axis of rotation of the at least one wheel is substantially parallel to the frame axis, and is above the frame axis when the wheel is coupled to the low-profile frame member and when the low-profile frame member is detachably secured to the helicopter.

11. The auxiliary apparatus as recited in claim 10, further comprising:

a mount adapted for detachably securing the low-profile frame member to the helicopter using at least one expandable bushing bolt.

12. The auxiliary apparatus as recited in claim 11, The saddle mount comprising at least one aperture adapted for accomnmodating the expandable bushing bolt, the aperture having an aperture axis which extends along a longitudinal length of the aperture and which is substantially parallel to a support surface.

13. The auxiliary apparatus as recited in claim 12, the low-profile frame member comprising a crosstube, and the at least one aperture comprising two parallel apertures which are adapted to accommodate two corresponding expandable bushing fittings, each of the two parallel apertures having an aperture axis that extends along a longitudinal length of the aperture and that is substantially parallel to an axis of the crosstube.

14. A saddle mount for detachably securing a crosstube to a helicopter using expandable bushing fittings, the crosstube having an axis extending along a longitudinal length of the crosstube, the saddle mount comprising:

at least two apertures disposed in the saddle mount and adapted for accommodating at least two corresponding expandable bushing fittings; and two members adapted to snugly fit around the crosstube, the two members together being movable between an open configuration wherein the saddle mount can be removed from around the crosstube and a closed configuration;

wherein the saddle mount is adapted to be closed around the crosstube to thereby secure the crosstube to the helicopter; and wherein the aperture axis of each of the at least two apertures extends along a longitudinal length of the aperture and is substantially parallel to the axis of the crosstube when the two members are snugly fit around the crosstube.

15. The saddle mount as recited in claim 14, wherein:

the saddle mount is adapted to accommodate two expandable bushing fittings into the two apertures of the saddle mount, when the saddle mount is in the closed configuration, to thereby secure the saddle mount around the crosstube;

the two expandable bushing fittings within the two apertures of the saddle mount can be removed from the two apertures of the saddle mount, when the saddle mount is in the closed configuration, to thereby facilitate removal of the saddle mount from around the crosstube; and the two members of the saddle mount, when moved into the closed configuration, forming a crosstube aperture having a semicircular cross section.

16. The saddle mount as recited in claim 15, the crosstube comprising a semicircular cross section, and the crosstube aperture having a semicircular cross section, a flat portion of the semicircular crosstube contacting flat portions of the crosstube aperture to thereby prevent the semicircular crosstube from rotating about an axis of the semicircular crosstube.

17. A crosstube assembly adapted for being detachably secured to a helicopter, comprising:

a front crosstube having an axis extending along a longitudinal length of the front crosstube;

a pair of front saddle mounts adapted to secure the front crosstube to the helicopter, each front saddle mount of the pair of front saddle mounts having at least two apertures which are disposed in the front saddle mount and which are adapted for accommodating at least two corresponding expandable bushing fittings therein, each front saddle mount including two front members which are adapted to snugly fit around the front crosstube the two front members together being movable between an open configuration wherein the front saddle mount can be removed from around the front crosstube and a closed configuration, each front saddle mount being adapted to be closed around the front crosstube to thereby secure the front crosstube to the helicopter, the aperture axis of each of the at least two apertures extending along a longitudinal length of the aperture and being substantially parallel to the axis of the front crosstube when the two front members are snugly fit around the front crosstube;

a rear crosstube having an axis extending along a longitudinal length of the rear crosstube; and a pair of rear saddle mounts adapted to secure the rear crosstube to the helicopter, each rear saddle mount of the pair of rear saddle mounts having at least two apertures which are disposed in the rear saddle mount and which are adapted for accommodating at least two corresponding expandable bushing fittings therein, each rear saddle mount including two rear members which are adapted to snugly fit around the rear crosstube, the two rear members together being movable between an open configuration wherein the rear saddle mount can be removed from around the rear crosstube and a closed configuration, each rear saddle mount being adapted to be closed around the rear crosstube to thereby secure the rear crosstube to the helicopter, the aperture axis of each of the at least two apertures extending along a longitudinal length of the aperture and being substantially parallel to the axis of the rear crosstube when the two rear members are snugly fit around the rear crosstube.

18. The crosstube assembly as recited in claim 17, the front crosstube and the rear crosstube comprising a pair of skid landing gear.

19. The crosstube assembly as recited in claim 17, the front crosstube and the rear crosstube comprising a pair of auxiliary crosstubes, each of the auxiliary crosstubes having two wheels attached at opposing ends thereof.

20. The crosstube assembly as recited in claim 19, each of the two wheels of at least one of the auxiliary crosstubes being pivotable about a separate axis that is substantially perpendicular to a longitudinal axis of the auxiliary crosstube and that is disposed between the wheel and the auxiliary crosstube.

21. A method of preparing a helicopter for storage or transportation within a low-clearance area, the method comprising the following steps:

removing a pair of skid landing gear from a fuselage of the helicopter;

securing a front crosstube to the fuselage of the helicopter, the front crosstube having two opposing ends and a crosstube axis extending therebetween, the maximum length of the front crosstube being defined between the two opposing ends, the front crosstube further comprising a pair of low-clearance wheels secured to the two opposing ends of the front crosstube; and securing a rear crosstube to the fuselage of the helicopter, the rear crosstube having two opposing ends and a rear crosstube axis extending therebetween, the maximum length of the rear crosstube being defined between the two opposing ends of the rear crosstube, the rear crosstube further comprising a pair of low-clearance wheels secured to the two opposing ends of the rear crosstube, the rear crosstube being separate from and unattached to the front crosstube before the rear crosstube is secured to the fuselage of the helicopter.

22. The method according to claim 21, the step of removing a pair of skid landing gear comprising a step of removing a plurality of saddle mounts from the pair of skid landing gear, and the steps of securing a front crosstube and securing a rear crosstube to the fuselage comprising a step of securing a plurality of front and rear saddle mounts to both the front crosstube and the rear crosstube.

23. The method according to claim 22, the saddle mounts being adapted for being removably secured to the skid landing gear with expandable bushing fittings, and the saddle mounts being adapted for being removably secured to both the front crosstube and the rear crosstube with expandable bushing fittings.

24. A crosstube assembly adapted for being detachably secured to a helicopter, comprising:

a front crosstube;

a pair of front saddle mounts adapted to secure the front crosstube to the helicopter using expandable bushing fittings;

a rear crosstube; and a pair of rear saddle mounts adapted to secure the rear crosstube to the helicopter using expandable bushing fittings;

wherein the front crosstube and the rear crosstube comprise a pair of auxiliary crosstubes, each of the auxiliary crosstubes having two wheels attached at opposing ends thereof; and wherein each of the wheels of at least one of the auxiliary crosstubes has a separate rotational axis that is changeable in height above a support surface, relative to the auxiliary crosstube.

25. A crosstube assembly adapted for being detachably secured to a helicopter, comprising:

a front crosstube;

a pair of front saddle mounts adapted to secure the front crosstube to the helicopter using expandable bushing fittings;

a rear crosstube; and a pair of rear saddle mounts adapted to secure the rear crosstube to the helicopter using expandable bushing fittings;

wherein the rear crosstube is separate from and unattached to the front crosstube when the rear crosstube is not secured to the helicopter.

* * * * *